United States Patent
McCullough et al.

(10) Patent No.: US 6,737,791 B2
(45) Date of Patent: May 18, 2004

(54) SNAP-ON SPRING CLIP FOR CERAMIC HID LAMP

(75) Inventors: Ebon L. McCullough, New Ipswich, NH (US); David J. Lamprey, Jr., Bow, NH (US)

(73) Assignee: Osram Sylvania Inc., Danvers, MA (US)

( * ) Notice: Subject to any disclaimer, the term of this patent is extended or adjusted under 35 U.S.C. 154(b) by 1 day.

(21) Appl. No.: 10/261,137

(22) Filed: Sep. 30, 2002

(65) Prior Publication Data

US 2004/0061445 A1 Apr. 1, 2004

(51) Int. Cl.⁷ .............. H01J 5/48; H01J 17/18; E04G 5/06
(52) U.S. Cl. ............ 313/50; 313/25; 313/284; 313/624; 313/49; 313/634; 362/217; 362/448; 403/187; 248/230.7; 248/231.81; 248/316.7
(58) Field of Search ............. 313/17, 20, 21, 313/25, 42, 43, 49–51, 284, 285, 624, 625, 633, 634, 292; 362/217, 448, 455, 225, 219, 382; 403/187, 188, 408.1, 230, 231, 244; 248/230.7, 231.81, 316.7, 594, 346.03, 346.06; 439/927, 236, 611, 617

(56) References Cited

U.S. PATENT DOCUMENTS

| 5,252,885 A | * | 10/1993 | Muzeroll et al. ........... 313/25 |
| 5,493,167 A | * | 2/1996 | Mikol et al. ............... 313/25 |
| 6,249,077 B1 | * | 6/2001 | Brown et al. .............. 313/25 |
| 6,628,080 B1 | * | 9/2003 | McCullough et al. ........ 315/56 |

* cited by examiner

Primary Examiner—Nimeshkumar D. Patel
Assistant Examiner—German Colón
(74) Attorney, Agent, or Firm—William E. Meyer

(57) ABSTRACT

A spring clip (10) has a base (12) in a first plane and has an aperture (14) centrally located therein. U-shaped projections (16) and (18) are provided on the base (12) and are formed from first and second upstanding walls (200 and (22) and third and fourth walls (24) and (26), at each end of the base (12). A first lip (28) extends orthogonally between the first wall and second wall in a second plane and a second lip (29) extends orthogonally between the third wall and fourth wall, also in the second plane. The second plane is substantially parallel to the first plane but spaced therefrom. Extensions (30) and (32) are formed with the first wall and the third wall and project away from them. The extension are in substantially the same plane as base (12) and at least one flag (34) can be formed with at least one of the extensions. The flags (34) project away from the extensions (32) in a plane transverse to the first and second planes and allow the clips to be attached to a frame.

3 Claims, 2 Drawing Sheets

SNAP-ON SPRING CLIP FOR CERAMIC HID LAMP

TECHNICAL FIELD

This invention relates to lamps and particularly to arc discharge lamps. Still more particularly, the invention relates to arc discharge lamps employing a ceramic arc tube, a shield or shroud and mounting means for mounting the arc tube within the shroud.

BACKGROUND ART

Metal halide arc discharge lamps are frequently employed in commercial usage because of their high luminous efficacy and long life. A typical metal halide arc discharge lamp includes a quartz or fused silica arc tube that is hermetically sealed within a borosilicate glass outer envelope. Recent advances in the art have employed a ceramic arc tube construed, for example, from polycrystalline alumina. It is with the latter type that this invention is particularly concerned. The arc tube, itself hermetically sealed, has tungsten electrodes sealed into opposite ends and contains a fill material that may include mercury, metal halide additives and a rare gas to facilitate starting. In some cases, particularly in high wattage lamps, the outer envelope is filled with nitrogen or another inert gas at less than atmospheric pressure. In other cases, particularly in low wattage lamps, the outer envelope is evacuated.

It has been found desirable to provide metal halide arc discharge lamps with a shroud that comprises a generally tubular, light-transmissive member, such as quartz, that is able to withstand high operating temperature. The arc tube and the shroud are coaxially mounted within the lamp envelope with the arc tube located within the shroud. Preferably, the shroud is a tube that is open at both ends.

In those lamps using an arc tube made from quartz or fused silica or like material, the arc tube has a generally tubular body sealed at the ends by a pinch seal. The pinch seals provide a flattened area on the arc tube that lends itself to receiving a mounting structure that both positions the arc tube within the shroud or shield and allows the entire structure to be mounted upon a suitable frame within an envelope.

The shroud or shield has several beneficial effects on lamp operation. In lamps with a gas-filled outer envelope, the shroud reduces convective heat losses from the arc tube and thereby improves the luminous output and the color temperature of the lamp. In lamps with an evacuated outer envelope, the shroud helps to equalize the temperature of the arc tube. In addition, the shroud effectively reduces sodium losses and improves the maintenance of phosphor efficiency in metal halide lamps having a phosphor coating on the inside surface of the outer envelope. Finally, the shroud improves the safety of the lamp by acting as a containment device in the event that the arc tube shatters.

In lamps using ceramic arc tubes, mounting the arc tube within a shroud has proven difficult and expensive. The ceramic arc tube has a tubular, often bulbous body with ceramic, cylindrical capillaries extending therefrom. The capillaries are relatively small, often having diameters of 3 mm or so, and contain the electrodes.

DISCLOSURE OF INVENTION

It is, therefore, an object of the invention to obviate the disadvantages of the prior art.

It is another object of the invention to enhance the mounting of arc tubes within shrouds.

It is yet another object of the invention to achieve these objects in an inexpensive manner.

These objects are accomplished, in one aspect of the invention, by a spring clip that comprises a base in a first plane and having an aperture centrally located therein. U-shaped projections are provided on the base and are formed from first and second upstanding walls and third and fourth upstanding walls, one at each end of the base. A first lip extends orthogonally between the first wall and second wall in a second plane and a second lip extends orthogonally between the third wall and fourth wall, also in the second plane. The second plane is substantially parallel to the first plane but spaced therefrom. Extensions are formed with the first wall and the third wall and project away from them. The extension are in substantially the same plane as base and at least one flag can be formed with at least one of the extensions. The flags project away from the extensions in a plane transverse to the first and second planes and allow the clips to be attached to a frame as will be seen below.

The clips are used to provide an assembly of an arc tube mounted within a shroud. The assembly then comprises a light source having a center and projecting, opposite ends arrayed along a longitudinal axis, the ends being cylindrical in cross-section. A tubular shroud surrounds the light source and is coaxial with the longitudinal axis. The shroud has two ends, and a given wall thickness. A pair of spring clips is provided, one at each end of the shroud, by fitting the U-shaped projections of the clips over the wall of the shroud. An arc tube is positioned between the clips with the ends of the arc tube encompassed within the apertures in the base of the clips. The clips are economical to manufacture, easy to use and avoid ergonomic problems that were associated with prior methods. They also lend themselves to automated assembly, further reducing the cost of the lamps with which they are used.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
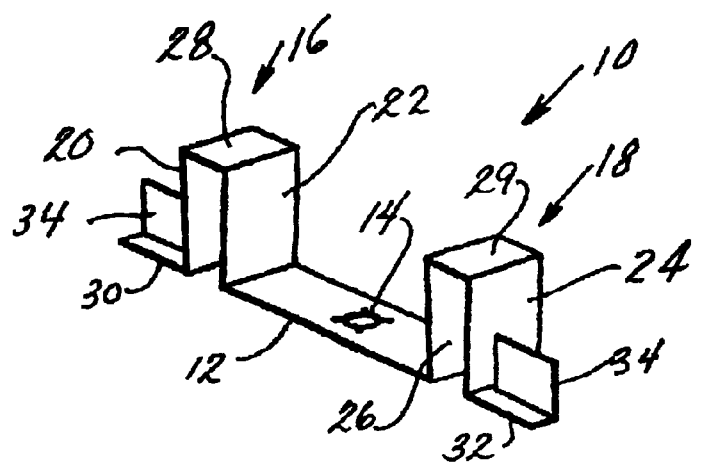
FIG. 1 is a perspective view of an embodiment of a clip of the invention.
Figure 2:
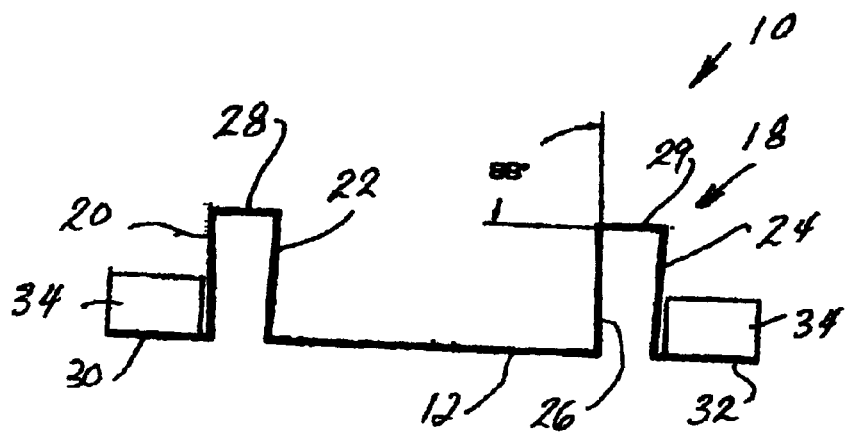
FIG. 2 is an elevational view thereof.

Referring now to the drawings with greater particularity, there is shown in FIGS. 1 and 2 a spring clip 10 that comprises a base 12 in a first plane and having an aperture 14 centrally located therein. U-shaped projections 16 and 18 are provided on the base 12 and are formed from first and second upstanding walls 20 and 22 and third and fourth walls 24 and 26, at each end of the base 12. A first lip 28 extends orthogonally between the first wall and second wall in a second plane and a second lip 29 extends orthogonally between the third wall and fourth wall, also in the second plane. The second plane is substantially parallel to the first plane but spaced therefrom. Extensions 30 and 32 are formed with the first wall and the third wall and project away from them. The extension are in substantially the same plane as base 12 and at least one flag 34 can be formed with at least one of the extensions. In FIGS. 1 and 2, two flags 34 are shown. The flags 34 project away from the extensions 32 in a plane transverse to the first and second planes and allow the clips to be attached to a frame as will be seen below.

Figure 3:
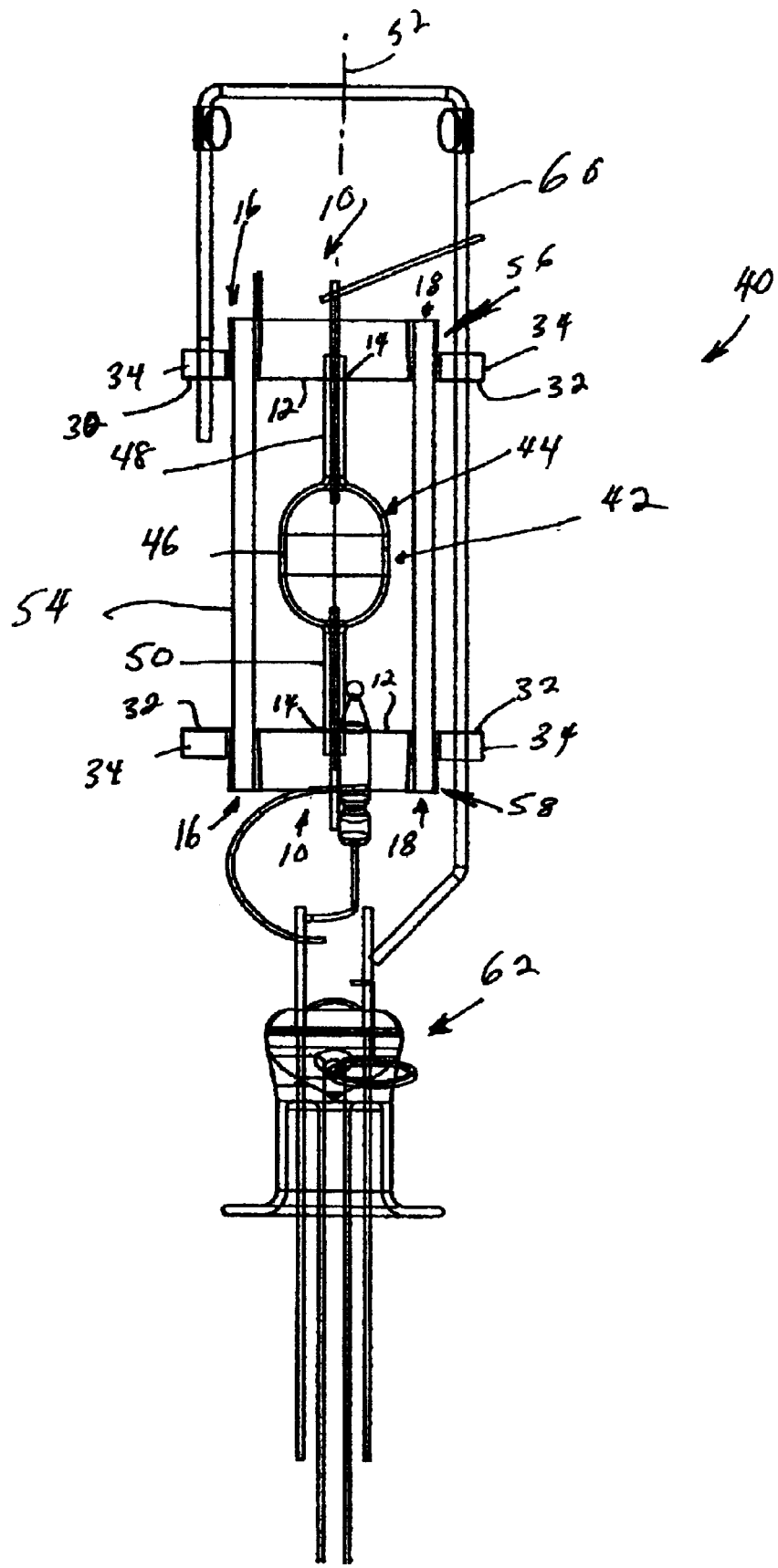
FIG. 3 is an elevational view, partially in section, of the clips of the invention in place on a shroud.

Referring now to FIG. 3 there is shown an assembly 40 for a lamp. The assembly comprises a light source 42, for example, a ceramic arc tube 44 having a bulbous center 46 and projecting, opposite ends 48, 50 arrayed along a longitudinal axis 52. The ends 48, 50 are cylindrical in cross-section. A tubular shroud 54 surrounds the light source 42 and is coaxial with longitudinal axis 52. The shroud 54 has two ends 56, 58, and a given wall thickness.

Spring clips 10 are attached to the shroud 54, one at each end, by fitting the U-shaped projections 16 and 18 over the ends of the shroud. In a preferred embodiment of the invention the walls of the U-shaped projections are formed at an angle of 88° to the vertical, as shown in FIG. 2, thus allowing a friction fit with the walls. By constructing the lips 28 and 29 larger than the given thickness of the shroud wall, variations in shroud wall thickness are accommodated.

Each of the ends 48, 50 of the light source 42 are frictionally engaged in the apertures 14 of the clips. After the clips and light source are mounted to the shroud to form a sub-assembly, the sub-assembly is mounted to a frame 60, for example by welding the flags 34 to the frame. The frame can then be attached to a conventional flare 62 for assembly into a lamp envelope. Alternatively, the frame can be mounted to the flare first and subsequently, the sub-assembly of shroud and arc tube can be mounted to the frame.

This structure thus provides an economical assembly for discharge lamps employing a shroud. The clips themselves are easy to manufacture and provide a good structural base for mounting the arc tube or other light source.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A spring clip comprising:
    a base in a first plane and having an aperture centrally located therein;
    U-shaped projections at each end of said base comprising first and second upstanding walls and third and fourth upstanding walls;
    a first lip extending orthogonally between said first wall and second walls in a second plane;
    a second lip extending orthogonally between said third and fourth walls in said second plane, said second plane being substantially parallel to said first plane:
        at least one extension formed with at least one of said first and third walls projecting away therefrom and at least one flag extending away from said extension in a plane transverse to said first and second planes.

2. An assembly for a lamp comprising:
    a light source having a center and projecting, opposite ends arrayed along a longitudinal axis, said ends being cylindrical in cross-section;
    a tubular shroud surrounding said light source coaxial with said longitudinal axis, said shroud having two ends, and a given wall thickness, the improvement comprising;
    a pair of sprig clips, one at each end of said shroud, each of said spring clips comprising a base in a first plane and having an aperture centrally located therein, each aperture of one of said spring clips frictionally engaging one of said cylindrical ends of said light source;
    U-shaped projections at each end of said base comprising first and second upstanding walls and third and fourth upstanding walls, said U-shaped projections being fitted ver the walls of said shroud;
    a first lip extending orthogonally between said first and second walls in a second plane;
    a second lip extending orthogonally between said third and fourth walls in said second plane, said second plane being substantially parallel to said first plane; and
    at least one extension formed with at least one of said first and third walls projecting away therefrom;
    said fist and third walls lying adjacent the outside surface of said shroud and said second and fourth walls lying adjacent the inside surface of said shroud.

3. The assembly of claim 2 wherein at least one flag is formed with at least one of said extensions, said at least one flag extending away from said extension in a plane transverse to said first and second planes.

* * * * *